Aug. 21, 1934.  J. J. PAUGH  1,970,941
METHOD OF AND MACHINE FOR RESISTANCE WELDING
Filed April 6, 1931
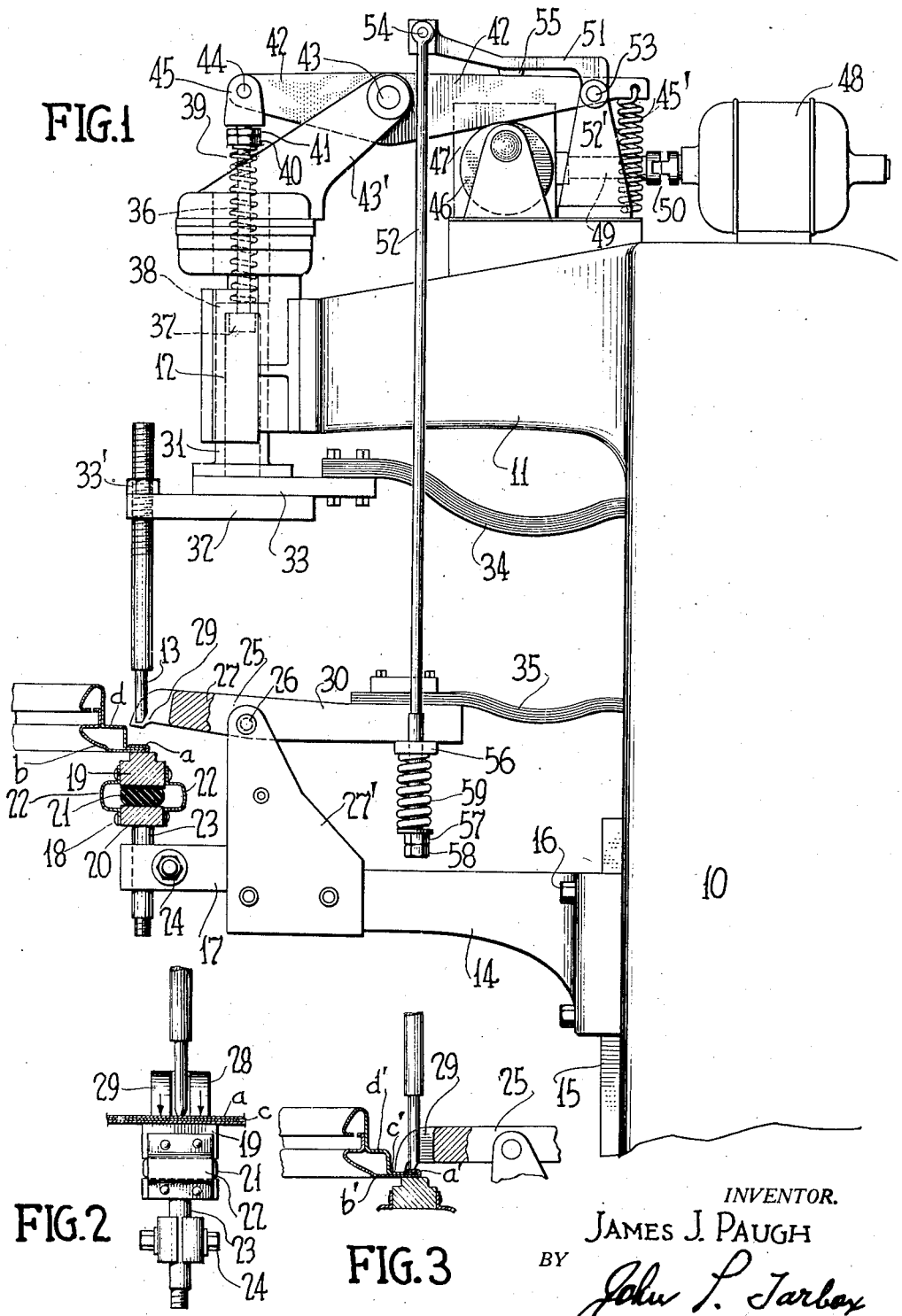
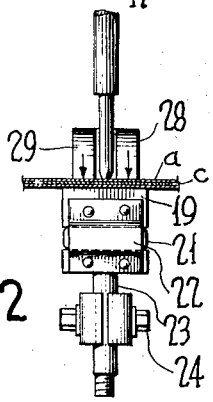
FIG.1
FIG.2
FIG.3
INVENTOR.
JAMES J. PAUGH
BY
John P. Tarbox
ATTORNEY.

Patented Aug. 21, 1934

UNITED STATES PATENT OFFICE 1,970,941

METHOD OF AND MACHINE FOR RESISTANCE WELDING

James J. Paugh, Philadelphia, Pa., assignor to Edward G. Budd Manufacturing Company, Philadelphia, Pa., a corporation of Pennsylvania Application April 6, 1931, Serial No. 527,929

11 Claims. (Cl. 219—4)

The invention relates to a method of resistance welding and to a machine for carrying out the method.

It is a particular object of my invention to produce a resistance weld, such as a spot weld connecting two or more thin sheets of metal in such manner as to eliminate the weld marks on one side of the work, such as depressions in the metal that are ordinarily produced under the heat of the weld and the pressure on the electrodes engaging opposite sides of the sheet. Such weld marks in the work are particularly objectionable on the outside of a door panel of a sheet metal door where they are produced by welding the crimped over flange of the outer panel to the flange of the door rail to form the door overlap flange along the margin of the door, or other work which is normally exposed to view in use. In such cases, it has been necessary to employ expensive grinding and filing operations on the surface of the panel to remove the marks. Particularly has it been difficult to avoid the appearance of such weld marks, where the overlapped sheets were all of relatively thin gauge.

It is a further object of my invention to effect such a weld with a minimum consumption of power and in a very short period of time.

It has heretofore been proposed to eliminate such marks by supporting the work on one side by a work support of high thermal conductivity and to clamp an electrode to one sheet of the work while engaging the work at a point remote from the clamped electrode with the other electrode. This method worked very satisfactorily where the one of the sheets to which the electrode was clamped was of heavier gauge than the sheet to be joined to it, but even then the welds were achieved only after a rather heavy consumption of power due to the high resistance of the area of the sheet through which the welding current had to pass between the relatively remote location of the electrodes, and also the time required in producing the weld was very considerable.

These difficulties I have, by my present invention, overcome, and largely by bringing the electrodes bearing on the work very close together, so that the current has to traverse but a very small distance through the work, and by applying the electrodes to the work under a differential pressure great enough to prevent a generation of a heat sufficient to fuse the metal at the point of contact of the electrode under the higher pressure, due to the lessened resistance to the passage of the current under this higher pressure, and to cause the formation of the weld under the electrode under the lower pressure, where the resistance to passage of the current between the sheets or between the sheet and electrode is greatest. The lessened resistance to the passage of the current through the sheet enables me to effect the weld in a shorter time.

It is also a feature of the invention that the time of application of the pressure and current are nicely controlled, and the differential pressures nicely adjustable to suit different conditions, the welding pressure being maintained just long enough to allow the current to produce the weld without heating the metal of the finished side of the sheet to a fusing temperature.

In the accompanying drawing I have illustrated a machine through the use of which my method may be effectively practiced, but it will be understood that the broad novel features of the method and machine may be varied without departing from the spirit of the invention, as this will be further disclosed in the following detailed description of specific embodiment shown.

In the drawing,

Fig. 1 is a side elevational view, parts being shown in section, of a standard type of spot welding machine showing my invention applied thereto.

Fig. 2 is a view at right angles to that shown in Fig. 1, the work being shown in section, showing the relation of the welding electrodes, the work support and the work.

Fig. 3 is a fragmentary side elevational view showing a slightly modified arrangement.

In the embodiment of the invention selected for illustration, the numeral 10 represents the standard or pedestal of a conventional type of spot welding machine having mounted on it a suitable welding transformer (not shown) and having the lateral projection 11 from its upper end which carries the welding head 12 which in turn carries a vertically reciprocable welding electrode 13. Some distance below the projection or horn 12, is arranged the projection or horn 14, which normally carries the welding electrode opposed to the electrode carried by the welding head 12. This lower projection or horn is adjustable (as usual) in a vertical direction on the standard being guided in its movement by a suitable guide, as 15, and firmly secured in adjusted position by the bolts 16, all in a usual manner.

According to my invention, I extend this horn 14 outwardly by a rigid extension 17, the outer end of which carries a work support, indicated generally by 18. This work support may comprise a block 19 of material of high thermal conductivity such as copper, the upper or work engaging face of which is of substantially flat form in this case to conform to the contour of the work. The block is preferably universally mounted to permit adjustment thereof to slight irregularities in the work and to this end it is mounted on another block 20, also preferably of material of high thermal conductivity, and spaced from it by a block of resilient material 21 such as rubber, the two blocks 19 and 20 being connected on opposite sides by strips 22 of sheet copper or other pliant material which also has, preferably, a high thermal conductivity. These strips are bent outwardly in substantially U-form to permit their ready distortion in accordance with the approach and separation and tilting movements of the universally mounted block 19 with respect to the fixed block 20. The block 20 is mounted on top of a rod 23, which in turn is adjustably clamped between the split end of the extension 17 by the clamping bolt 24.

One of the electrodes 25 of the improved machine is pivotally mounted at 26 on a pair of spaced brackets 27' (only one of which appears in the drawing) mounted on the opposite sides of the projection 14 adjacent its outer end. This electrode is in the form of a lever, the outer arm 27 of which is short and forked at its end arranged over the work support to provide the spaced downwardly projecting work engaging points 28 and 29 spaced from each other to permit the movement of the reciprocating electrode 13 between them.

To obtain a good mechanical advantage the other arm 30 of the pivoted electrode 25 is extended toward the pedestal 10 a considerable distance and is engaged at this end by the actuating means therefor.

The electrode 13 is offset outwardly from the welding head 12 to bring it into alignment with the work support and the outer forked end of the pivoted electrode 25 and is secured to the lower flanged end of a vertically reciprocating tubular member 31 slidably mounted in the welding head 12. This connection is in the present instance shown to be through a pair of plates 32 and 33 secured to the flanged end of the member 31 and projecting in opposite directions therefrom. In one of these, 32, the electrode 13 is adjustably mounted by a screw threaded engagement with its projecting end, and locked in place by a lock nut 33', and with the other 33, one terminal 34 of the secondary of the transformer is connected. The other terminal 35 of the transformer secondary is secured to arm 30 of the other electrode 25.

It will be understood, of course, that the electrodes are suitably insulated by means not deemed necessary to show herein from their mounting means.

The means for operating the electrodes will now be described. In Fig. 1 of the drawing, the machine is shown in idle position with the electrodes raised. The upper portion of the head 12 is provided with a central opening through which extends the operating rod 36 connected with the hollow reciprocating member 31. This rod has its lower end formed with a head 37 which in the raised position of the rod comes up against the closed end 38 of the member 31. A spring 39 surrounds the rod and bears at one end against the closed end of the member 31 and at the other end against the adjustable nut 40 backed up by a lock nut 41, threaded onto a threaded portion of the rod. By adjustment of these nuts the tension of the spring may be varied to give the required pressure upon the electrode 13. A lever 42 pivoted between its ends at 43 between the two inclined arms 43' (only one appearing in the drawing) is pivotally connected at 44 to the enlarged head 45 to which the upper end of the rod 36 is secured. The opposite end of the lever is connected to a tension spring 45' which constantly tends to return the electrode to the raised position shown in Fig. 1. When the lever 42 is moved to cause the electrode 13 to engage the work, as soon as the work is engaged and the rapid downward movement of the electrode stopped, the rod 36 moves relative to the member 31, and the pressure on the electrode is determined entirely by the pressure of the spring 39 as then adjusted.

To apply the pressure to the electrode 13 uniformly and in correctly timed relation, I preferably operate the lever 24 by a cam 46 driven at a uniform rate of speed through reduction gearing mounted in the gear box 47 from an electric motor 48 mounted on top of the pedestal 10 and connected by shafting 49 and clutch as 50 to the gear reduction.

The clutch is preferably a well-known type of clutch which is automatically disengaged after each operation when the cam has made a complete revolution, so that the machine will always be at rest with the electrodes in the raised position, as shown in Fig. 1.

The pivoted electrode 25 may be operated in common with the cam 46 and in timed relation to the movement of electrode 13 through the levers 51 and links 52. The levers and links are arranged in pairs on opposite sides of the machine, only one pair being shown in the drawing, the other pair being a duplicate of the pair shown. The levers 51 are pivoted at 53 on the vertically extending brackets 52', their opposite ends being pivotally joined to the links 52 at 54 and the intermediate portion of the levers on the opposite sides are joined by a bridge member 55 resting on top of the long arm of the lever 42 over the cam 46. The link rods project at their lower ends some distance below the arm 30 of the pivoted electrode and pass through holes in a cross bar 56 secured to the under side of said arm, with which cross bar they have a sliding engagement. Between the bar and adjustable nuts 57 held in adjusted position by lock nuts 58 are arranged powerful coil springs 59 which determine the pressure exerted on the pivoted electrode under the action of the cam 46. The pressure exerted by these springs upon the electrode points 28 and 29 is so proportioned to the pressure upon the electrode point 13 under the action of its spring 39, that there is a very substantial differential between the pressures, ranging, let us say, from a ratio of 2 to 1 to 6 to 1. I have found a ratio of 4 to 1 to be a very good relation between the pressures for the welding of thin sheet metal panels, such as are used in automobile doors, the forked electrode being under the greater pressure.

The welding method and machine of my invention are shown applied to the welding of the crimped over flange a of the outer panel b of a sheet metal door to edge flange c of the door rail d. In the practice of my invention as indicated in Figs. 1 and 2, both electrodes engage the crimped over flange, the forked electrode at spaced points on opposite sides and closely adjacent the point of engagement of the electrode 13, the work support 19 being arranged in opposed relation on the other side of the work, which it is desired to maintain free from weld marks. In the practice of the invention the cam 46 is rotated from the position shown in Fig. 1 a complete revolution and in such rotation, the electrode points 28 and 29 are first pressed against the work with a powerful pressure and the electrode 13 is then brought into contact with the work with a less powerful pressure, during which time the welding current is passed between the electrodes. By reason of the close adjacency of the electrodes, the current need travel but a short distance through the work, and since the resistance to its passage between surfaces of the work and between the work and the electrodes varies inversely as the pressure, the point where the least pressure is applied, namely, under the electrode 13 is the point at which fusion will first take place and the weld be effected. The time of passage of the current and the voltage is so regulated that just enough fusion takes place under the pressure of the electrode 13 to produce the weld without fusing the metal of the outer face of the panel b. The high thermal conductivity of the work support, of course, aids this condition since it also prevents the heat in the outer face of the panel from reaching a fusing temperature. The time of the passage of the welding current may be synchronized with the rotation of the cam and adjusted by any suitable means (not shown).

In the modification shown in Fig. 3 where the crimped over flange a' of the outer panel b' is of less width than the edge flange c' of the rail d' the heavy pressure electrode may have its points 28 and 29 make engagement directly with the flange of the rail at points closely adjacent to the point of engagement of the electrode 13 with the flange a'. With such arrangement, the conditions are even better than under the conditions of Figs. 1 and 2 for the making of the weld, since the welding current must pass the joint between the two overlapping sheets of the work, the electrical resistance of which is, at least for the materials ordinarily welded by resistance welding, higher than that between the electrodes and the work.

While I have herein described a specific machine for carrying out the novel method of my invention, it will be understood that changes and modifications may be made both in the machine and in the method without departing from the spirit and scope of the invention as expressed in the language of the appended claims.

What I claim is:

1. In a resistance welding machine for welding together the overlap edges of a work piece comprising a work support for engaging one side of the work, means including an electrode for simultaneously engaging spaced points on the other side of the work, and a second electrode for engaging the same side of the work between said points, together with means for pressing said first-named means into engagement with the work under a heavier pressure than said second electrode.

2. In a resistance welding machine, a work support for engaging the work on one side thereof, a pivoted forked electrode for engaging the opposite side of the work at spaced points, a reciprocating electrode engaging the work on the same side thereof between said spaced points and a continuously driven member for synchronously actuating said electrodes.

3. In a resistance welding machine, a pedestal, a horn projecting from said pedestal, a work support for engaging one side of the work, a forked electrode pivoted on said horn and adapted to engage the work on the side opposite said support, means for actuating the electrode to clamp the work between it and the support, and a vertically reciprocable electrode movable to engage the work between the forks of said first-named electrode and on the same side of the work.

4. In a resistance welding machine, a yieldingly mounted work support permitting limited universal movement and adapted to engage one side of the work, a forked electrode adapted to engage the opposite side of the work, a second electrode adapted to engage the same side of work at a point between the forks of the first-mentioned electrode and means for exerting a differential pressure on said electrodes, whereby the weld is effected under the electrode of lesser pressure.

5. In a resistance welding machine, a work support adapted to engage one side of the work, a forked electrode adapted to engage the opposite side of the work, a second electrode adapted to engage the work between said forks of the first electrode, and means for actuating said electrodes in timed relation.

6. In a resistance welding machine, a work support adapted to engage one side of the work, a forked electrode adapted to engage the opposite side of the work to clamp it between the electrode and said support, a second electrode adapted to engage the work between the forks of said first-named electrode, and common actuating means for said electrodes actuating them to engage the work successively.

7. In a resistance welding machine, a work support for engaging one side of the work, means including an electrode for simultaneously engaging the other side of the work at spaced points to clamp it to the work support, another electrode engaging the work between said spaced points and on the same side of the work, and means for firmly pressing the first-named electrode into engagement with the work prior to and with a pressure greater than that applied to the second electrode.

8. The method of resistance welding two or more overlapped sheets of metal involving the support of the work from one side, pressing spaced points of the work against the support by electrode engagement under heavy pressure with its opposite side and while under such heavier pressure, bringing another electrode in engagement with the same side of the work between said points under substantially less than said first named pressure, and passing the welding current between said electrodes during such engagement whereby the weld is effected under the electrode under the lesser pressure.

9. A method of resistance welding two or more thin metal sheets which consists in simultaneously applying heavy electrode pressure to the sheets at spaced points, and applying a lesser electrode pressure on the same side of the work by another electrode and while the work is so under pressure, passing a welding current between the electrodes, whereby a weld is formed in the area engaged by the electrode applying the lesser pressure.

10. In a resistance welding machine, a work support for engaging one side of the work, electrodes engaging closely adjacent points of the opposite side of the work and means for pressing said electrodes against the work with a differential pressure not less than in the ratio of 1 to 2.

11. In a resistance welding machine, a work support opposed to the electrodes and adapted to support the work during the welding operation, electrodes of different polarity adapted to engage the work at spaced points, and means for pressing said electrodes against the work under a differential pressure in about the ratio of 1 to 4.

JAMES J. PAUGH.